United States Patent
Bae et al.

(10) Patent No.: US 10,234,153 B2
(45) Date of Patent: Mar. 19, 2019

(54) WATER LEAKAGE PREVENTING HUMIDIFICATION APPARATUS

(71) Applicant: COWAY CO., LTD., Chungcheongnam-do (KR)

(72) Inventors: Jun-Hyoung Bae, Seoul (KR); Kyung-Mi Lee, Seoul (KR); Chan-Yong Lee, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 382 days.

(21) Appl. No.: 14/381,101

(22) PCT Filed: Dec. 27, 2012

(86) PCT No.: PCT/KR2012/011545
§ 371 (c)(1),
(2) Date: Aug. 26, 2014

(87) PCT Pub. No.: WO2013/129764
PCT Pub. Date: Sep. 6, 2013

(65) Prior Publication Data
US 2015/0021795 A1    Jan. 22, 2015

(30) Foreign Application Priority Data

Feb. 29, 2012  (KR) .................. 10-2012-0021039
Dec. 7, 2012   (KR) .................. 10-2012-0142216

(51) Int. Cl.
*F24F 6/00*   (2006.01)
*F16K 15/18*  (2006.01)
*F16K 15/02*  (2006.01)

(52) U.S. Cl.
CPC ............... *F24F 6/00* (2013.01); *F16K 15/02* (2013.01); *F16K 15/18* (2013.01); *F24F 2006/008* (2013.01)

(58) Field of Classification Search
CPC ....... F24F 2006/008; F24F 6/00; F16K 15/18; F16K 15/02; F16K 15/00; F16K 15/185
See application file for complete search history.

(56) References Cited

U.S. PATENT DOCUMENTS 2,140,516 A * 12/1938 Cowan .................. F22B 1/284
                                                     392/336
2,576,110 A * 11/1951 Fisher .................. A61M 11/041
                                                     128/203.17

(Continued)

FOREIGN PATENT DOCUMENTS

CN       101354173       1/2009
CN       102162661       8/2011

(Continued)

OTHER PUBLICATIONS

State Intellectual Property Office of China (SIPO) Chinese Office Action, dated Jun. 30, 2016 (5 pages).

(Continued)

*Primary Examiner* — Stephen Hobson
(74) *Attorney, Agent, or Firm* — Dority & Manning, P.A.

(57) ABSTRACT

There is provided a water leakage preventing humidification apparatus including: a housing; a water tank installed in the housing and storing water for humidification; a water bottle having a water guide unit having an outlet formed therein to allow water to flow out therefrom, and installed in the water tank to provide water for humidification to the water tank; an installation part disposed in the water tank and having a confinement water formed to surround at least a portion of the circumference of the water guide unit of the water bottle and a water tank input hole formed on one end of the bottom surface along which water flowing out through the outlet flows and communicating with the water tank; and a humidification unit provided to perform humidification with water stored in the water tank.

7 Claims, 6 Drawing Sheets

(56) References Cited

U.S. PATENT DOCUMENTS

| | | | | |
|---|---|---|---|---|
| 2,588,747 A * | 3/1952 | Morton | | D06F 75/18 38/77.83 |
| 2,810,167 A * | 10/1957 | Parks, Sr. | | A61M 11/041 392/324 |
| 3,322,405 A * | 5/1967 | Knudson | | F24F 6/04 261/106 |
| 3,385,351 A * | 5/1968 | Ralston | | F24F 1/02 165/122 |
| 4,604,246 A * | 8/1986 | Choe | | F24F 6/12 165/60 |
| 4,810,854 A * | 3/1989 | Jursich | | F24F 6/18 392/405 |
| 4,818,344 A * | 4/1989 | Glucksman | | B01D 1/0017 202/176 |
| 4,921,639 A * | 5/1990 | Chiu | | F24F 6/12 137/256 |
| 5,014,338 A * | 5/1991 | Glucksman | | F24F 6/025 200/81.9 R |
| 5,061,405 A * | 10/1991 | Stanek | | F24F 6/043 261/104 |
| 5,131,070 A * | 7/1992 | Chiu | | F24F 6/025 200/81.9 M |
| 5,143,460 A * | 9/1992 | Wang | | F24F 6/025 200/81.9 R |
| 5,210,818 A * | 5/1993 | Wang | | F22B 1/284 392/394 |
| 5,242,375 A * | 9/1993 | McDonough | | A61G 11/00 600/22 |
| 5,361,322 A * | 11/1994 | Glucksman | | F24F 6/025 239/138 |
| 5,447,663 A * | 9/1995 | Dix | | F24F 6/00 261/104 |
| 5,636,319 A * | 6/1997 | Glucksman | | F24F 6/025 392/406 |
| 5,677,982 A * | 10/1997 | Levine | | F24F 1/02 392/391 |
| 5,746,359 A * | 5/1998 | Stanek | | F24F 1/02 220/304 |
| 5,853,625 A * | 12/1998 | Kensok | | F24F 6/043 239/289 |
| 5,918,804 A * | 7/1999 | Jung | | B05B 17/0615 236/44 A |
| 6,176,474 B1 * | 1/2001 | Stanek | | B65D 1/18 261/66 |
| 6,226,451 B1 * | 5/2001 | Wong | | F24F 6/025 261/142 |
| 6,257,171 B1 * | 7/2001 | Rivard | | A01K 1/031 119/419 |
| 6,259,860 B1 * | 7/2001 | Chen-Lung | | F24F 6/00 392/403 |
| 6,314,237 B1 * | 11/2001 | Glucksman | | A47J 27/04 219/433 |
| 2003/0067086 A1 * | 4/2003 | Mulvaney | | F24F 6/00 261/107 |
| 2003/0164559 A1 * | 9/2003 | Rhea | | F16K 15/185 261/66 |
| 2004/0004299 A1 * | 1/2004 | Glucksman | | F22B 1/284 261/129 |
| 2008/0093750 A1 * | 4/2008 | Wang | | F24F 6/00 261/66 |
| 2010/0133707 A1 * | 6/2010 | Huang | | A61L 9/20 261/81 |
| 2010/0225012 A1 * | 9/2010 | Fitton | | F24F 1/01 261/116 |
| 2011/0232304 A1 * | 9/2011 | Bortoletto | | F25D 17/042 62/78 |
| 2012/0234166 A1 * | 9/2012 | Markham | | A61L 9/20 95/214 |
| 2013/0154134 A1 * | 6/2013 | Lev | | F24F 6/12 261/141 |
| 2015/0048530 A1 * | 2/2015 | Cheung | | A61M 16/16 261/129 |
| 2015/0084214 A1 * | 3/2015 | Wilson | | C02F 1/325 261/32 |
| 2015/0084215 A1 * | 3/2015 | Ojeda | | F24F 6/043 261/71 |

FOREIGN PATENT DOCUMENTS

| | | |
|---|---|---|
| JP | 06-041068 Y2 | 10/1994 |
| JP | 2006-057943 A | 3/2006 |
| JP | 2008-020115 A | 1/2008 |
| JP | 2012-013361 A | 1/2012 |

OTHER PUBLICATIONS

Written Opinion of the International Searching Authority PCT/KR2012/0011545, (3 Pages), dated Apr. 8, 2013.

\* cited by examiner

WATER LEAKAGE PREVENTING HUMIDIFICATION APPARATUS

CROSS REFERENCE TO RELATED APPLICATIONS

This application is the U.S. National Stage entry of International Application Number PCT/KR2012/011545 filed under the Patent Cooperation Treaty having a filing date of Dec. 27, 2012, which claims priority to Korean Patent Application Serial Number 10-2012-0021039 having a filing date of Feb. 29, 2012 and Korean Patent Application Serial Number 10-2012-0142216 having a filing date of Dec. 7, 2012, all of which are hereby incorporated by reference herein in their entirety for all purposes.

TECHNICAL FIELD

The present invention relates to a water leakage preventing humidification apparatus for preventing water leakage and, more particularly, to a water leakage preventing humidification apparatus capable of preventing water from leaking when the humidification apparatus is sloped.

BACKGROUND ART

In general, a humidification apparatus is an apparatus artificially generating and releasing moisture to increase humidity of an indoor area.

Humidification apparatuses may be classified into various types thereof, according to a method of generating moisture used therein.

First, a heating type humidification apparatus naturally releases steam generated by heating water stored in a water tank within an indoor area. A supersonic humidification apparatus releases water particles vaporized by ultrasonically-vibrating water stored in a water tank.

Also, a compound humidification apparatus including both a heating type humidification scheme and an ultrasonic humidification scheme has been used.

Recently, a natural (a ventilation type) humidification apparatus in which a humidification filter is immersed in a water tank and water moving upwardly of the humidification filter is vaporized by an air blast or in which some of a plurality of disks are immersed in a water tank and rotated to allow water remaining to surfaces of the disks to be vaporized has also been used.

Figure 1:
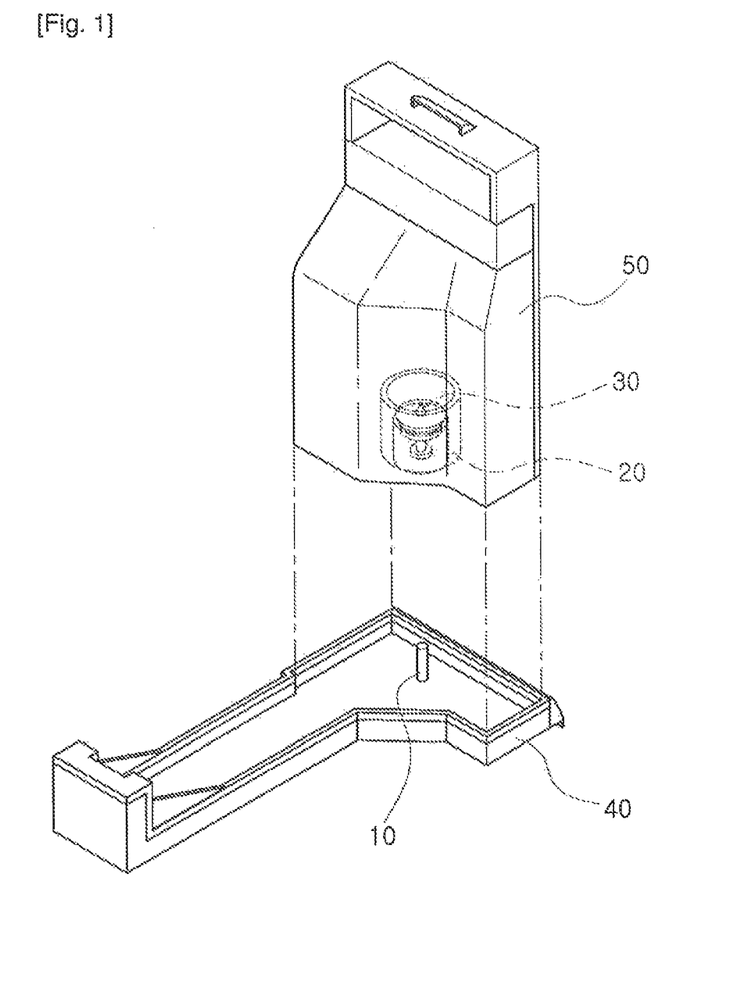
FIG. 1 is a perspective view of a related art humidification apparatus.

Meanwhile, referring to FIG. 1, in a related art humidification apparatus, in a state in which a water tank 40 and a water bottle 50 are coupled, a valve 30 of an opening and closing unit 20 provided in the water bottle 50 is pressurized by a protrusion 10 so as to be opened.

Thereafter, when a water surface of the water tank 40 is consistent with a lower end of the opening and closing unit 20, air cannot be introduced and water stored in the water bottle 50 may no longer be discharged to the outside.

However, when the humidification apparatus is sloped due to a movement thereof, or the like, water accommodated in the water tank 50 may be moved to one side therein, so that water accommodated in the water tank 40 and water stored in the water bottle 50 are separated, generating space in the separated spot to allow air to be introduced thereto.

Here, since air is introduced to the interior of the water bottle 50 through the opening and closing unit 20 opened in a state of being coupled to the protrusion 10, water within the water bottle 50 is discharged to the outside according to the introduction of air.

As a result, when the related art humidification apparatus is sloped due to a movement thereof, or the like, water continuously flows out of the water bottle 50 to overflow to the outside.

DISCLOSURE OF INVENTION

Technical Problem

An aspect of the present invention provides a water leakage preventing humidification apparatus capable of preventing water from leaking even in the case that the humidification apparatus is sloped.

Solution to Problem

According to an aspect of the present invention, there is provided a water leakage preventing humidification apparatus, including: a housing; a water tank installed in the housing and storing water for humidification; a water bottle having a water guide unit having an outlet formed therein to allow water to flow out therefrom, and installed in the water tank to provide water for humidification to the water tank; an installation part disposed in the water tank and having a confinement water formed to surround at least a portion of the circumference of the water guide unit of the water bottle and a water tank input hole formed on one end of the bottom surface along which water flowing out through the outlet flows and communicating with the water tank; and a humidification unit provided to perform humidification with water stored in the water tank, wherein when the housing is sloped at a predetermined angle or more, a water confinement space is formed between the confinement wall and the water tank input hole of the installation part to confine water therein.

In an embodiment, the bottom surface of the installation part may extend in a length direction of the water tank.

Here, the outlet may be positioned in a front surface of the bottom surface of the installation part, and the water tank input hole may be positioned in a rear surface of the bottom surface of the installation part.

Also, the installation part may be disposed in a rear portion of the water tank.

Also, in an embodiment, the outlet may be open in a position opposite to the water tank input hole.

Meanwhile, the confinement wall of the installation part may be formed to extend upwardly from the edge of the bottom surface of the installation part such that it is higher than the outlet, when the water bottle is installed in the installation part.

Also, the humidification apparatus may further include: a protrusion formed in the installation part and pressurizing the opening and closing unit formed on the water bottle to open the opening and closing unit, when the water guide unit is installed in the installation part.

The protrusion may be protruded from the bottom surface of the installation part.

Meanwhile, in another embodiment, the bottom surface of the installation part may be formed to be sloped downwardly toward the water tank input hole.

Also, the humidification apparatus may further include: a water tank cover coupled to an upper end of the water tank, wherein the installation part may be formed in the water tank cover.

In a water leakage preventing humidification apparatus according to another embodiment of the present invention, the installation part may be protruded from the bottom of the water tank.

Meanwhile, the housing may further include an air purifying filter installed therein.

Advantageous Effects of Invention

In the case of the water leakage preventing humidification apparatus according to embodiment of the present invention, although the water leakage preventing humidification apparatus is sloped, water trapped in a settling region blocks an outlet of the water bottle, thus preventing water from leaking from the water bottle.

Also, in the case of the water leakage preventing humidification apparatus according to embodiment of the present invention, when the water leakage preventing humidification apparatus is sloped, since an outlet is positioned to be lower than a water level and a water tank input hole is positioned to be higher than the water level, thus preventing water from leaking from the water bottle.

BEST MODE FOR CARRYING OUT THE INVENTION

In the present disclosure, singular forms "a", "an" and "the" are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Hereinafter, a humidification apparatus 1000 will be described in detail with reference to the accompanying drawings.

Figure 2:
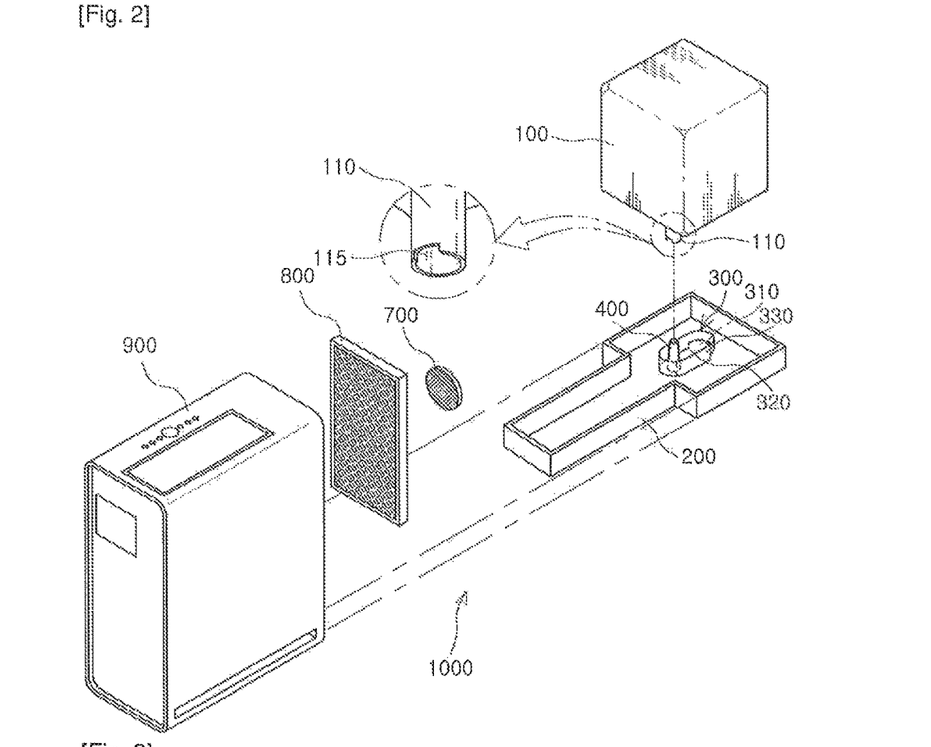
FIG. 2 is an exploded perspective view of a water leakage preventing humidification apparatus according to an embodiment of the present invention.

Referring to FIG. 2, the humidification apparatus 1000 according to an embodiment of the present invention includes a housing 900, a water bottle 100, and a water tank 200.

The housing 900 forms an outer appearance of the humidification apparatus 1000 according to an embodiment of the present invention.

The water bottle 100 may be installed in the water tank 200 and provide water for humidification to the water tank 200.

The water tank 200 may be insertedly installed in the housing 300 and store water for humidification to provide stored humidification water to a humidification unit 700.

Hereinafter, respective components will be described in detail.

Referring to FIG. 2, the water bottle 100 includes a water guide unit 110 having an outlet 115 allowing water to be discharged therethrough, in order to provide water used for humidification.

In an embodiment, the water guide unit 110 may extend from a lower portion of the water bottle 100 in a length direction.

The water guide unit 110 may have a hollow structure to guide a movement of water when water stored in the water bottle 100 is introduced to the water tank 200.

Figure 4:
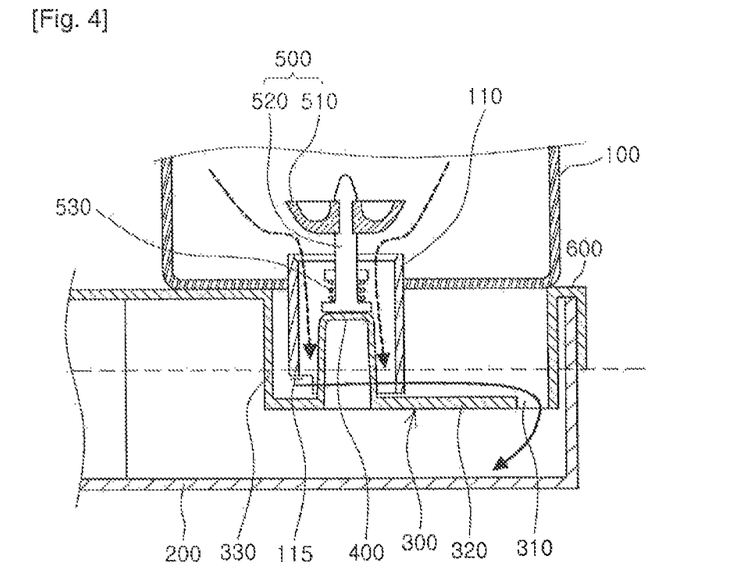
FIG. 4 is a cross-sectional view illustrating the water leakage preventing humidification apparatus maintained horizontally according to an embodiment of the present invention.
Figure 7:
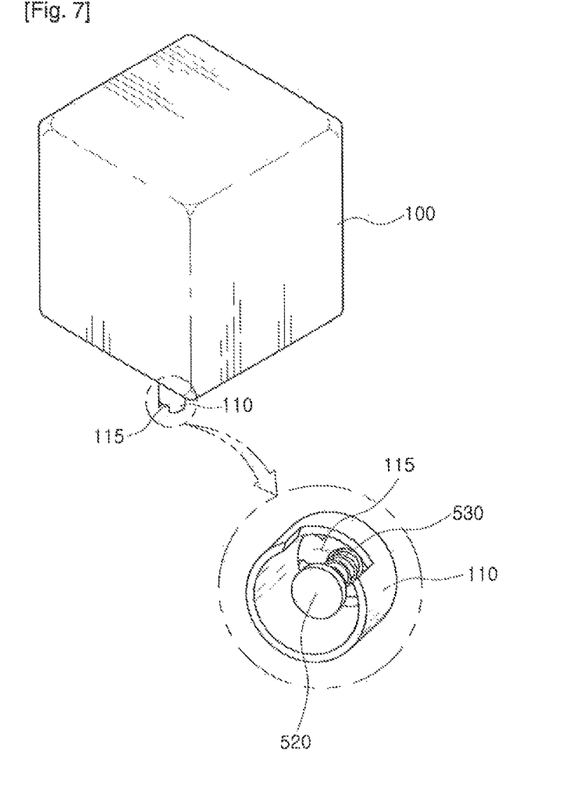
FIG. 7 is a perspective view illustrating an interior of a water guide unit of the water leakage preventing humidification apparatus according to an embodiment of the present invention.

Also, referring to FIGS. 4 and 7, an opening and closing unit 500 for opening and closing the water bottle 100 may be provided within the water guide unit 110

Here, the opening and closing unit 500 may include a sealing unit 510 opening and closing the water guide unit 110 to allow water to flow out therefrom or flow in therethrough, and a rod unit 520 connected to the sealing unit 510 to drive the sealing unit 510.

An elastic unit 530 such as a spring, or the like, may be coupled to one side of the rod unit 520 in order to return the opening and closing unit 500 to its original position after being opened.

Meanwhile, as shown in FIG. 2 or 4, the outlet 115 may be formed on an end portion of the water guide unit 110. However, the position of the outlet 115 is not limited thereto and may be changed according to a required appropriate level.

As illustrated in FIG. 2, the outlet 115 may be formed by cutting away a portion of an end of the water guide unit 110.

Meanwhile, the water tank 200 may be provided to store water supplied from the water bottle 100.

Figure 3:
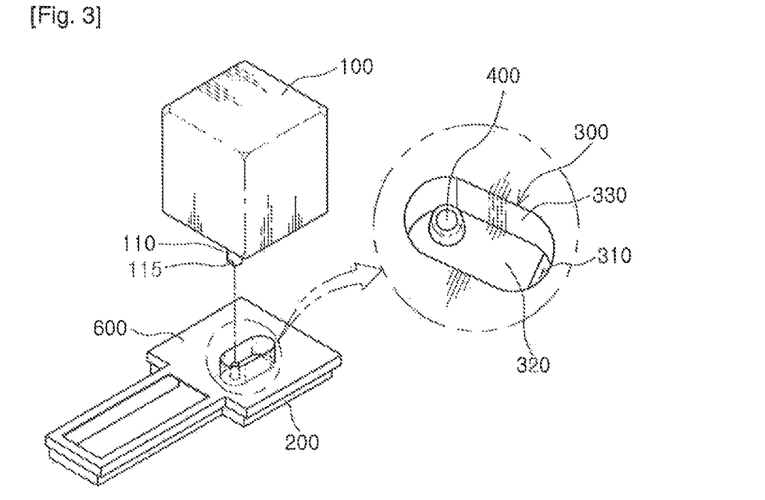
FIG. 3 is an exploded perspective view of a water bottle and a water tank of the water leakage preventing humidification apparatus according to an embodiment of the present invention.

An installation part 300 allowing the water guide unit 110 of the water bottle 100 to be installed therein may be disposed in the water tank 200. In an embodiment, the water tank 200 may have a shape elongated in a forward and a backward direction. Here, based on a length direction of the water tank, a side in which the water bottle 100 is not installed is a front surface, and the opposite side is a rear surface.

Meanwhile, the installation part 300 may be disposed in the rear surface of the water tank 200.

In an embodiment, the installation part 300 may include a bottom surface 320 and a confinement wall 330 to form a recess accommodating the water guide unit 110, and may have a water tank input hole 310 formed on one end of the bottom surface 320 and communicating with the water tank 200.

Here, the bottom surface 320 forms a water circulation path allowing water flowing out through the outlet 115 from the water bottle 110 to circulate to the water tank 200.

In an embodiment, the bottom surface 320 may extend in a length direction of the water tank 200.

Also, the confinement wall 330 is formed to surround at least a portion of the circumference of the water guide unit 110 of the water bottle 100. The confinement wall 330 may form a water confinement space confining water in the installation part 300 in association with the bottom surface 320.

To this end, the confinement wall 330 may extend upwardly from the edge of the bottom surface 320.

Here, the confinement wall 330 may be formed to be higher than the outlet 115 formed on the water guide unit 110 when the water bottle 100 is installed in the installation part 300.

The water tank input hole 310 formed on one end of the bottom surface 320 of the installation part 300 is a water inlet allowing water introduced to the installation part 300 through the outlet 115 from the water bottle 100 to flow into the water tank 200.

Meanwhile, in an embodiment, the installation part 300 may be formed in a water tank cover 600 coupled to an upper end of the water tank 200. Here, the water tank cover 600 may be coupled to an upper end of the water tank 200 at a rear surface of the water tank 200 and supports a lower end of the water bottle 100 installed in the water tank 200.

Meanwhile, the installation part 300 may include a protrusion 400.

The protrusion 400 may press the opening and closing unit formed on the water bottle 100 to open the opening and closing unit, when the water guide unit 110 is installed in the installation part 300.

In an embodiment, the protrusion 400 may be protruded from the bottom surface 320 of the installation part 300.

Figure 5:
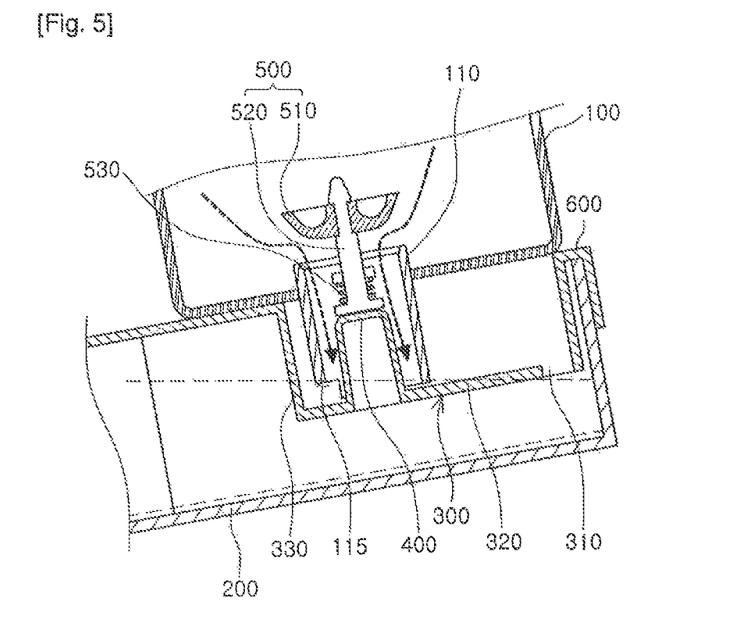
FIGS. 5 and 6 are cross-sectional views illustrating sloped water leakage preventing humidification apparatuses according to an embodiment of the present invention.

Here, as illustrated in FIGS. 4 and 5, when the water bottle 100 is installed in the installation unit 300, the protrusion 400 formed on the installation part 300 may pressurize the rod unit 520 of the opening and closing unit 500 to lift the rod unit 520.

Accordingly, the sealing unit 510 coupled to the rod unit 520 is lifted from the water guide unit 110 so as to be released from its contact with the water guide unit 110, opening the water guide unit 110.

Figure 6:
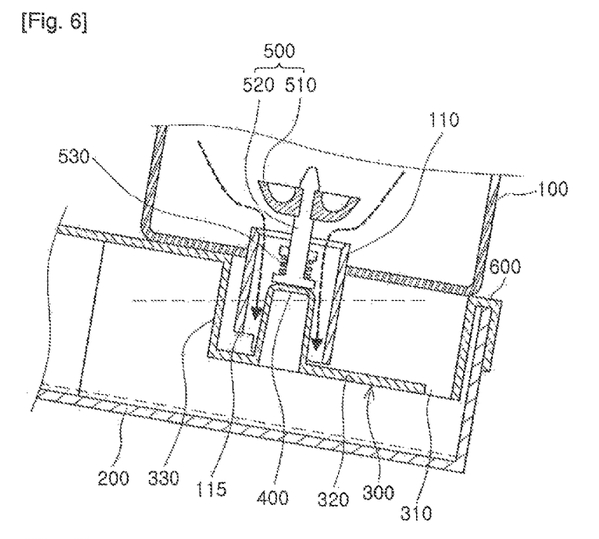

Meanwhile, in the embodiment illustrated in FIGS. 4 through 6, when the water bottle 100 is installed in the installation part 300, the outlet 115 may be positioned in a front surface of the bottom surface 320 of the installation part 300 and the water tank input hole 310 may be positioned in a rear surface of the bottom surface 320.

Namely, the outlet 115 and the water tank input hole 310 may be disposed to be spaced apart by the medium of the bottom surface 320 of the installation part 300. Accordingly, when the housing 900 is sloped, there may be a difference in height between the outlet 115 and the water tank input hole 310.

Also, the outlet 115 of the water guide unit 110 may be open in a position opposite to the water tank input hole 310. Accordingly, when the housing 900 is sloped, the outlet 115 may be reliably immersed in water confined in the confinement space.

Meanwhile, referring to FIG. 2, the humidification unit 700 performs humidification with water accommodated in the water tank 200. Here, the humidification unit 700 may perform humidification according to various methods and the humidification method is not limited.

An air purifying filter 80 may be provided within the housing 900 in order to purify air introduced to the housing 900.

Here, a plurality of air purifying filters 800 may be provided and various types of filters may be provided.

Hereinafter, an operation of supplying water to the water tank 200 of the humidification apparatus 1000 having the foregoing configuration according to an embodiment of the present invention will be described with reference to FIGS. 4 through 6.

First, as illustrated in FIG. 4, in case that the water tank 200 is placed horizontally, when water accommodated in the water tank 200 fills up to the outlet 115 formed on the water guide unit 110, water blocks the outlet 115, preventing air from being introduced to the water bottle 110, so water stored in the water bottle 100 cannot flow out therefrom.

Also, as illustrated in FIG. 5, when the water tank 200 is sloped forwardly (i.e., when the water tank 200 is sloped leftwardly in the drawing), namely, when the portion in which the water bottle 100 of the water tank 200 is lifted, the water tank input hole 310 is positioned higher than water level of water accommodated n the water tank 200, so water is confined in the water confinement space formed by the confinement wall 330 and the water tank input hole 310 of the installation part 300.

Here, the outlet 115 is closed by water confined in the water confinement space, preventing air from flowing into the water bottle 100, and thus, water stored in the water bottle 100 cannot flow out therefrom.

Thus, although the water tank 200 is sloped, water leakage from the water bottle 100 can be prevented.

Meanwhile, as illustrated in FIG. 6, when the water tank 200 is sloped backwardly (i.e., when the water tank 200 is sloped rightwardly in the drawing), namely, when a front surface of the water tank 200 is lifted, since the installation part 300 is disposed in the rear surface of the water tank 200, water stored in the water tank 200 is collected to the rear surface of the water tank 200, raising a water level of water stored in the rear surface of the water tank 200.

Accordingly, since the water level of water is lifted, water blocks the outlet 115, preventing water leakage.

The humidification apparatus 1000 according to another embodiment of the present invention will be described with reference to FIGS. 8 and 9.

Figure 8:
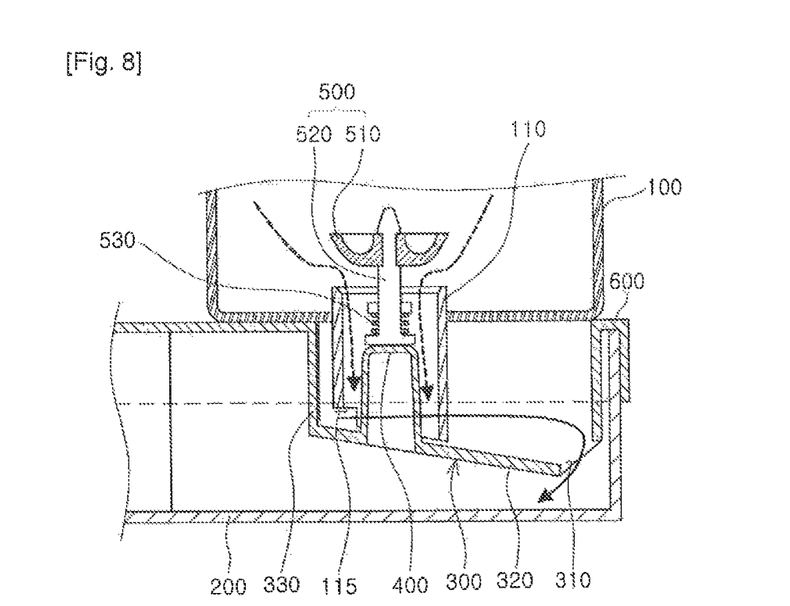
FIG. 8 is a cross-sectional view illustrating the water leakage preventing humidification apparatus maintained horizontally according to another embodiment of the present invention.
Figure 9:
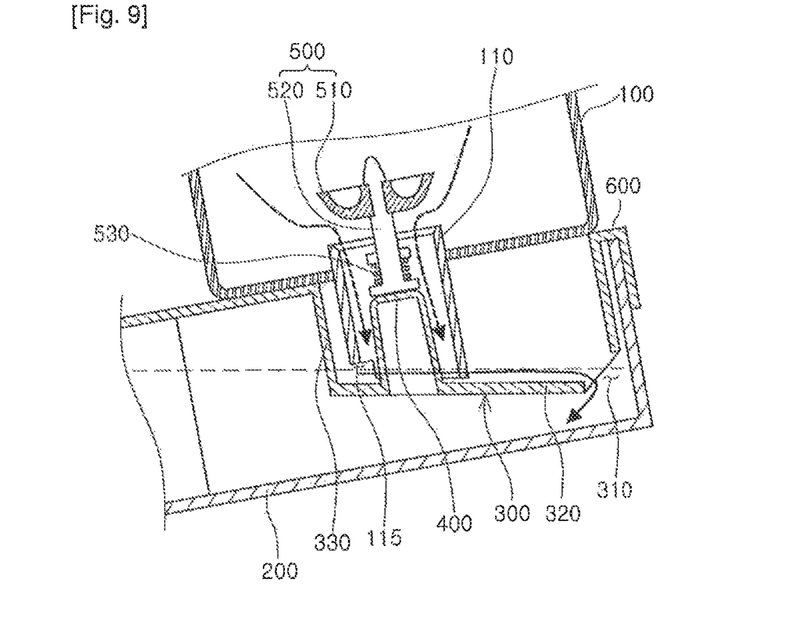
FIG. 9 is a cross-sectional view illustrating a sloped water leakage preventing humidification apparatus according to another embodiment of the present invention.

As illustrated in FIGS. 8 and 9, the bottom surface 320 of the installation part 300 may be formed to be sloped downwardly toward the water tank input hole 310.

Thus, although the humidification apparatus 1000 according to an embodiment of the present invention is installed in a slightly sloped area, water can flow along the bottom surface 320 so as to be smoothly supplied to the water tank 200.

Namely, in case that the humidification apparatus 1000 is installed in an area which is sloped, rather than being completely horizontal, so it may be internally sloped forwardly of the water tank 200, if the water tank input hole 310 of the installation part 300 is formed at a position higher than the outlet 115 of the water guide unit 110, water cannot flow to the water tank input hole 310 along the installation part 300 but block the outlet 115, preventing water stored in the water bottle 100 from flowing out through the outlet 115.

In order to solve this problem, in the humidification apparatus 1000 according to another embodiment of the present invention, the bottom surface 320 of the installation part 300 is formed to be sloped downwardly toward the water tank input hole 310, so, although the humidification apparatus 1000 is installed in an area sloped at an angle within a predetermined range, the outlet 115 may be positioned to be higher than or equal to the water tank input hole 310.

For example, when the humidification apparatus 1000 according to an embodiment of the present invention is designed to smoothly perform a water supply operation although it is installed in an area sloped by 6 or less, the installation part 300 may be formed at a tilt angle of 6.

Figure 10:
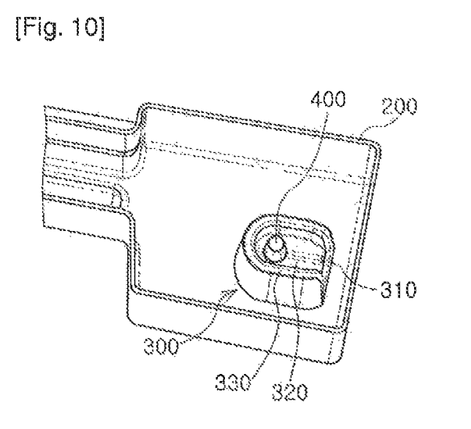
FIG. 10 is a view illustrating a water tank and a settling region of the water leakage preventing humidification apparatus according to another embodiment of the present invention.
Figure 11:
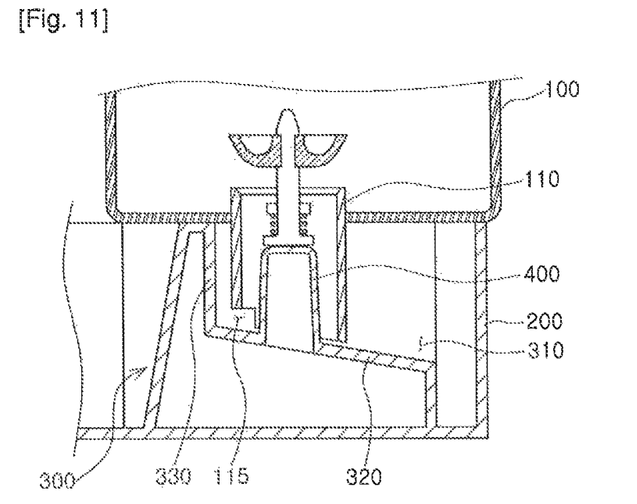
FIG. 11 is a cross-sectional view illustrating an installation structure of the water bottle with respect to the water tank of the water leakage preventing humidification apparatus according to another embodiment of the present invention.

FIGS. 10 and 11 are a perspective view and a cross-sectional view illustrating the water tank 200 of the humidification apparatus 1000 according to another embodiment of the present invention.

As illustrated in FIGS. 10 and 11, unlike the humidification apparatus 1000 according to the embodiment illustrated in FIGS. 3 through 9, the humidification apparatus 1000 according to another embodiment of the present invention has a structure in which the installation part 300 is protruded from the bottom of the water tank 200, rather than being formed in the water tank cover 600.

Here, the bottom surface 320 of the installation part 300 may be formed in a position raised by a predetermined height from the bottom of the water tank 200, and the confinement wall 330 may be protruded upwardly along the edge of the bottom surface 320.

Here, the water tank input hole 310 is be formed as a portion of the confinement wall 330 is excluded.

In this manner, when the installation part 300 is integrally formed with the water tank 200, an extra component such as the water tank cover 600 for forming the installation part 300 is excluded, a number of assembly components of the apparatus can be reduced and the configuration of the apparatus is simplified.

The invention claimed is:

1. A water leakage preventing humidification apparatus comprising:
   a housing;
   a water tank installed in the housing and storing water for humidification and formed in a shape elongated in forward and backward directions;
   a water bottle having a water guide unit having an outlet formed therein to allow water to flow out therefrom, and installed in the water tank to provide water for humidification to the water tank;
   an installation part disposed in the water tank and having a confinement wall formed to surround the circumference of the water guide unit of the water bottle and a water tank input hole formed on one end of the bottom surface along which water flowing out through the outlet flows and communicating with the water tank; and
   a humidification unit provided to perform humidification with water stored in the water tank,
   wherein when the housing is sloped at a predetermined angle or more such that there is a difference in height between the outlet and the water tank input hole, a water confinement space is formed between the confinement wall and the water tank input hole of the installation part, to confine water therein,
   wherein the installation part and the water tank input hole are formed at positions higher than the bottom of the water tank, and
   wherein the installation part is disposed in a rear surface of the water tank,
   wherein the bottom surface of the installation part extends in a length direction of the water tank,
   wherein the water tank input hole is positioned in a rear portion of the bottom surface of the installation part, and
   wherein the outlet is opened in a position opposite to the water tank input hole, such that the outlet is configured to prevent air from entering the water bottle and water from exiting the water bottle when the housing is sloped at the predetermined angle or more.

2. The water leakage preventing humidification apparatus of claim 1, wherein the confinement wall of the installation part is formed to extend upwardly from the edge of the bottom surface of the installation part such that the confinement wall is higher than the outlet, when the water bottle is installed in the installation part.

3. The water leakage preventing humidification apparatus of claim 1, further comprising:
   a protrusion formed in the installation part and pressurizing an opening and closing unit formed on the water bottle to open the opening and closing unit, when the water guide unit is installed in the installation part.

4. The water leakage preventing humidification apparatus of claim 1, wherein the bottom surface of the installation part is formed to be sloped downwardly toward the water tank input hole.

5. The water leakage preventing humidification apparatus of claim 1, further comprising:
   a water tank cover coupled to an upper end of the water tank,
   wherein the installation part is formed in the water tank cover.

6. The water leakage preventing humidification apparatus of claim 1, wherein the installation part is protruded from the bottom of the water tank.

7. The water leakage preventing humidification apparatus of claim 1, wherein the housing further includes an air purifying filter installed therein.

* * * * *